March 14, 1933. J. F. BREWER 1,901,729
LIFTER
Filed May 14, 1932
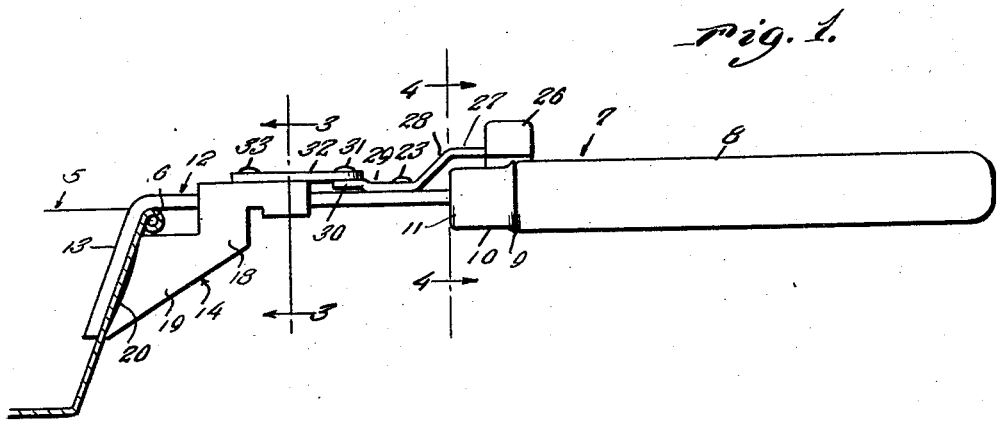
Inventor
John F. Brewer
By Clarence A. O'Brien
Attorney Patented Mar. 14, 1933

1,901,729

UNITED STATES PATENT OFFICE

JOHN F. BREWER, OF OSSINING, NEW YORK, ASSIGNOR OF ONE-HALF TO ARTHUR GREENFIELD, OF NEW YORK, N. Y.

LIFTER

Application filed May 14, 1932. Serial No. 611,420.

My invention relates to improvements in pot and pan lifters and an important object of the invention is to provide a strong and rugged device of this type, which operates very efficiently and easily without getting out of order.

It is also an important object of my invention to provide a device of this character which may be quickly and easily and conveniently locked upon the pot and pan so that the pot or pan may be carried about and lifted without further attention to or continued application of the gripping means once it has been properly engaged therewith.

Other objects and advantages of my invention will be apparent from a reading of the following description in connection with the drawing, wherein for purposes of illustration I have shown a preferred embodiment of the invention.

In the drawing:

Figure 1 is a general side elevational view of the embodiment showing it applied to a pot or pan, Figure 2 is a top plan view of Figure 1 showing in dotted lines the released position of the gripping means, Figure 3 is a transverse vertical sectional view taken approximately on the line 3—3 of Figure 1 looking in the direction of the arrows, Figure 4 is another transverse vertical sectional view taken approximately on the line 4—4 of Figure 1 looking in the direction of the arrows.

Referring in detail to the drawing, wherein like numerals refer to like parts throughout the same, the numeral 5 generally designates a conventional type of pot or pan or the like, having a peripheral bead 6 at the upper edge thereof projecting outwardly. For cooperating with this structure for lifting and carrying purposes, the device of the invention generally designated at 7 comprises the elongated handle 8 which as seen in Figure 2 is wider transversely than it is vertically. One end of the handle 8 is reduced as indicated at 9 and fitted with a ferrule 10 which has a cylindrical portion 11 of uniform circular contour. Projecting from the end of the handle through the ferrule 10 is a flat normally horizontal bar 12 which has at its outer end an angularly and downwardly deflected portion 13 which as seen in Figure 1 is adapted to engage the inner surface of the pot or pan, the upper edge of which is then immediately disposed under the bar. For sliding upon the bar 12 I provide the gripping slide generally designated 14 which comprises the plate 15 having depending flanges 16 which carry inwardly projected flanges 17 whereby to form with the under side of the plate 15 an open channel acting as a guide for sliding upon the bar 12. The flanges 16 are located at the inward end portion of the slide 14. Spaced forwardly or outwardly from the flanges 16 are longer flanges 18 which carry outwardly positioned triangular forms 19 having the angular pot engaging surfaces 20. It will be noted that these pot engaging surfaces 20 are slightly cusped to provide edges on the extremities of the said surfaces for better engaging the exterior of the pot and for providing for irregular surfaces of the pots or pans to be handled. It will be observed in Figure 1 that the upper boundaries of the triangular forms 19 are adapted to engage under the peripheral bead 6 and cooperate therewith in lifting and carrying the pot or pan. A web 21 extends between the triangular forms 19 for bracing and integrating the same.

For operating the slide 14 backwardly and forwardly on the bar 12 and for locking the slide 14 in the outward position in clamping engagement with the pot or pan, I have provided the manually operable lever generally designated 22 pivoted near one end as indicated at 23 to the upper surface of the bar 12. The lever 22 is in the form of an elongated plate 24 having a laterally extended portion 25 and a right angular flange 26 which projects upwardly from the longitudinal edge of the elongated plate 24 opposite the extension 25. As seen in Figure 4 the extension 25 is downwardly curved substantially with the same curvature as the cylindrical portion 11 of the ferrule 10. The extension 25 prevents swinging of the lever 22 beyond a certain point, so as to prevent the lever from acting on the opposite side of the handle 8. As seen in Figure 1 the elongated plate 24 is horizontal or parallel to the bar 12 and a portion indicated by the numeral 27 has a continuation in a downwardly angular portion 28 which is followed by the parallel portion 29 on whose end is the slightly upwardly offset end portion 30 provided with the pivot pin or rivet 31 which pivotally connects a short link 32 by one end, the other end of the link 32 being pivotally connected in a similar manner at 33 to an intermediate portion of the upper side of the slide 14. It will be obvious that when the manual lever 22 is swung into the dotted line position in Figure 2 that the slide will be retracted from clamping engagement with the pot or pan.

It will also be obvious that with the lever in the position shown in Figure 1 that the slide will be locked in the forward clamping relationship. An arrangement of the elements may be made whereby the lever overbalances itself when brought to the position shown in Figure 1, whereby the slide will be positively locked in the extended position. If desired an arrangement may be made whereby it will be necessary to hold the manual lever 22 against or close to the handle for maintaining the slide 14 in the clamping relationship.

Though I have shown and described herein a preferred embodiment of the invention, it is to be definitely understood that I do not desire to limit the application of the invention thereto, but any change or changes may be made in material and structure and arrangement of parts within the spirit of the invention and the scope of the subjoined claims.

Having thus described my invention, what I claim as new is:

1. A pot lifter comprising a handled jaw member for engaging the interior of the pot, another jaw member slidable on the handled jaw member and engageable with the exterior of the pot, a laterally swingable operating lever pivoted upon one side of the handled jaw member, a link pivoted to the lever and to the other jaw member.

2. A pot lifter comprising a handle equipped rod, a laterally disposed jaw on the rod for engaging the interior of the pot, a slidable jaw carried by the rod for engaging the exterior of the pot, pivoted link equipped means on the side of the rod opposite that on which the laterally disposed jaw extends, for operating the slidable jaw into and out of gripping position.

3. A pot lifter comprising a handle equipped rod, a jaw on the rod for engaging the interior of the pot, a slidable jaw carried by the rod for engagement with the exterior of the pot, pivoted link equipped means on the rod for operating the slidable jaw into and out of clamping position, a portion of the link equipped means being eccentrically mounted and operable to retain said slidable jaw in clamping position.

4. A pot lifter comprising a handle member, a fixed jaw at one end thereof for engaging the interior of the pot, a movable jaw slidable on the handle member for engaging the exterior of the pot, an operating lever pivoted intermediate its ends in the handle member so as to swing in a plane parallel to the plane of the handle member, a link pivotally connected to the lever and to the movable jaw member and also swingable in a plane parallel to that of the handle.

5. A pot lifter comprising a handle member, a fixed jaw thereon for engaging the interior of a pot, a movable jaw longitudinally slidable on the handle member and engageable with the exterior of the pot, a transversely swingable operator pivoted on the handle member, pivoted connection means between the operator and the movable jaw, said operator being eccentrically mounted and operable to retain the movable jaw in clamping position on the pot.

6. A pot lifter comprising a handle equipped bar, a fixed jaw on the bar for engaging the interior of a pot, a movable jaw slidably mounted on the bar for engaging the exterior of the pot, an operating lever pivoted to one side of the bar and swingable in a plane substantially at right angles to the plane in which the jaws are located, and connection means between the operator and the movable jaw.

7. A pot lifter comprising a flat bar provided at one end with a handle and at the other with a laterally offset fixed jaw, a movable jaw slidable on one side of the bar, an operating lever swingably mounted on the opposite side of the bar, and connection means between the operating lever and the movable jaw.

8. A pot lifter comprising a flat bar provided at one end with a handle and at the other with a laterally offset fixed jaw, a movable jaw slidable on one side of the bar, an operating lever swingably mounted on the opposite side of the bar, and connection means between the operating lever and the movable jaw, said operating lever being swingable in a plane parallel to the plane of the bar.

9. A pot lifter comprising a flat bar provided at one end with a handle and at the other with a laterally offset fixed jaw, a movable jaw slidable on one side of the bar, an operating lever swingably mounted on the opposite side of the bar, and connection means between the operating lever and the movable jaw, said operating lever being swingable in a plane parallel to the plane of the bar, and eccentrically mounted and operable to retain the movable jaw in clamping position.

10. A pot lifter comprising a flat bar provided at one end with a handle and at the other with a laterally offset fixed jaw, a movable jaw slidable on one side of the bar, an operating lever swingably mounted on the opposite side of the bar, and connection means between the operating lever and the movable jaw, said operating lever being swingable in a plane parallel to the plane of the bar, and eccentrically mounted and operable to retain the movable jaw in clamping position, said operating lever being operable in a plane substantially at right angles to the plane of the fixed jaw.

In testimony whereof I affix my signature.

JOHN F. BREWER.